(12) United States Patent
Kobayashi et al.

(10) Patent No.: US 12,257,972 B2
(45) Date of Patent: Mar. 25, 2025

(54) SIDE AIRBAG DEVICE

(71) Applicant: Autoliv Development AB, Vargarda (SE)

(72) Inventors: Yuto Kobayashi, Kanagawa (JP); Mitsuo Nogami, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/905,803

(22) PCT Filed: Feb. 6, 2021

(86) PCT No.: PCT/JP2021/004469
§ 371 (c)(1),
(2) Date: Sep. 7, 2022

(87) PCT Pub. No.: WO2021/181970
PCT Pub. Date: Sep. 16, 2021

(65) Prior Publication Data
US 2024/0217472 A1    Jul. 4, 2024

(30) Foreign Application Priority Data
Mar. 12, 2020    (JP) ................. 2020-042631

(51) Int. Cl.
*B60R 21/231*    (2011.01)
*B60R 21/207*    (2006.01)
*B60R 21/261*    (2011.01)

(52) U.S. Cl.
CPC ...... *B60R 21/23138* (2013.01); *B60R 21/207* (2013.01); *B60R 21/261* (2013.01); *B60R 2021/23146* (2013.01)

(58) Field of Classification Search
CPC ............ B60R 21/207; B60R 21/23138; B60R 2021/23146
See application file for complete search history.

(56) References Cited

U.S. PATENT DOCUMENTS 5,816,610 A * 10/1998 Higashiura ........... B60R 21/207
                                                     280/730.2
6,062,593 A * 5/2000 Satani ................... B60R 21/207
                                                     280/730.2
(Continued)

FOREIGN PATENT DOCUMENTS

CN        107891834 A        4/2018
DE    102004001216 A1 *     7/2004    ........... B60R 21/207
(Continued)

OTHER PUBLICATIONS

Office Action received in corresponding Chinese Patent Application 202180013377.9, dated Apr. 14, 2023 with translation.

*Primary Examiner* — Drew J Brown
(74) *Attorney, Agent, or Firm* — Harness, Dickey & Pierce, P.L.C.; Stephen T. Olson

(57) ABSTRACT

The present invention is a side airbag device stowed in a side support part of a vehicle seat, which includes: an airbag capable of expanding and deploying toward a front side from the side support part; an inflator that supplies expansion gas to the airbag; and a bracket that retains the airbag in a compressed state. The inflator is secured to an inner side (occupant side) of a side frame of the vehicle seat. Furthermore, the bracket has a rear region that covers a rear side of the airbag in a compressed state and an inner region that extends continuously forward from the rear region between an inner side of the airbag and a seat pad.

14 Claims, 6 Drawing Sheets

A1-A1 cross section

(56) References Cited

U.S. PATENT DOCUMENTS

| | | | |
|---|---|---|---|
| 6,206,466 B1 * | 3/2001 | Komatsu | B60R 21/207 280/730.2 |
| 6,220,624 B1 * | 4/2001 | Abraham | B60R 21/207 280/730.2 |
| 6,450,528 B1 * | 9/2002 | Suezawa | B60R 21/207 280/730.2 |
| 2002/0130495 A1 | 9/2002 | Lotspih | B60R 21/207 280/730.2 |
| 2006/0255572 A1 * | 11/2006 | Svenbrandt | B60R 21/233 280/730.2 |
| 2007/0273129 A1 * | 11/2007 | Inoue | B60R 21/207 280/730.2 |
| 2008/0100044 A1 * | 5/2008 | Cho | B60R 21/207 280/730.2 |
| 2009/0026814 A1 * | 1/2009 | Kim | B60R 21/207 297/216.1 |
| 2010/0283229 A1 * | 11/2010 | Feller | B60N 2/986 296/65.01 |
| 2013/0119646 A1 * | 5/2013 | Tracht | B60R 21/217 29/428 |
| 2014/0008898 A1 * | 1/2014 | Tracht | B60R 21/23 280/730.2 |
| 2014/0284907 A1 * | 9/2014 | Akiyama | B60R 21/201 280/730.2 |
| 2015/0151711 A1 * | 6/2015 | Fujiwara | B60R 21/235 280/728.2 |
| 2015/0166003 A1 * | 6/2015 | Fujiwara | B60R 21/26 280/730.2 |
| 2015/0343980 A1 * | 12/2015 | Hotta | B60R 21/215 280/728.3 |
| 2015/0360636 A1 * | 12/2015 | Kaneko | B60N 2/68 280/730.2 |
| 2016/0101760 A1 * | 4/2016 | Fujiwara | B60R 21/2334 280/728.3 |
| 2016/0185312 A1 * | 6/2016 | Zimmermann | B60R 21/207 280/728.2 |
| 2017/0101072 A1 * | 4/2017 | Shiga | B60R 21/207 |
| 2017/0225640 A1 * | 8/2017 | Ohno | B60R 21/264 |
| 2018/0022308 A1 * | 1/2018 | Kunisada | B60R 21/23138 280/730.2 |
| 2018/0050651 A1 * | 2/2018 | Fukawatase | B60R 21/233 |
| 2018/0093633 A1 * | 4/2018 | Komura | B60N 2/68 |
| 2019/0176740 A1 * | 6/2019 | Hioda | B60N 2/2222 |
| 2021/0129787 A1 * | 5/2021 | Kobayashi | B60R 21/2346 |
| 2023/0311802 A1 * | 10/2023 | Jaworowicz | B60R 21/207 280/730.2 |
| 2024/0217472 A1 * | 7/2024 | Kobayashi | B60R 21/207 |

FOREIGN PATENT DOCUMENTS

| | | | | |
|---|---|---|---|---|
| DE | 102009014107 A1 * | 9/2010 | | B60N 2/4492 |
| DE | 102009016887 A1 * | 10/2010 | | B60N 2/7017 |
| DE | 102009016888 A1 * | 10/2010 | | B60R 21/207 |
| DE | 102011086471 A1 * | 5/2013 | | B60R 21/207 |
| JP | H1024798 A | * | 1/1998 | |
| JP | H1080590 A | * | 3/1998 | |
| JP | H1081187 A | * | 3/1998 | |
| JP | H10175497 A | * | 6/1998 | |
| JP | H10230811 A | * | 9/1998 | |
| JP | 11-91488 A | | 4/1999 | |
| JP | 2017121869 A | * | 7/2017 | B60N 2/58 |
| JP | 2018-58433 A | | 4/2018 | |
| WO | WO-2009039962 A1 * | 4/2009 | | B60R 21/207 |
| WO | 2012/035619 A1 | | 3/2012 | |
| WO | 2014/017211 A1 | | 1/2014 | |
| WO | WO-2021181970 A1 * | 9/2021 | | B60R 21/207 |

* cited by examiner

A1-A1 cross section

SIDE AIRBAG DEVICE

TECHNICAL FIELD

The present invention relates to a side airbag device equipped in a vehicle seat.

BACKGROUND ART

In order to protect occupants in the event of a vehicle collision, it is well known that vehicles are equipped with one or a plurality of airbags. These airbags include, for example, various forms such as: a so-called driver airbag which expands from near the center of the steering wheel of an automobile so as to protect a driver; a curtain airbag which deploys downward along an inner side of a window of the automobile so as to protect an occupant during a collision in a lateral direction of the vehicle, as well as when overturning and during a rollover accident; and a side airbag which is deployed between an occupant and a side panel so as to protect the occupant upon impact in the lateral direction of the vehicle. The present invention relates to a side airbag device.

The side airbag system is stowed inside a side support part of a seat. Therefore, there are many shape and size restrictions, and it is not easy to ensure that the airbag deploys in a stable forward-facing behavior. In particular, when an inflator and airbag are stowed and arranged on an inner side of a side frame of a seat (on occupant side), they tend to deploy toward the rear or diagonally to the rear of the seat, making the airbag deployment behavior (deployment direction and deployment posture) even more difficult to control.

Therefore, the side airbag device may be arranged in the seat with the side airbag device completely stowed in a rigid housing. However, if a housing is used, a module as a whole increases in size. Thus, it is necessary to provide a precisely adjusted opening part (door, window) so as not to impede airbag deployment, which complicates the structure and inevitably increases costs.

SUMMARY OF THE INVENTION

Problem to be Solved by the Invention

In light of the foregoing, an object of the present invention is to provide a side airbag device capable of stabilizing airbag deployment behavior while having a simple configuration.

Means to Solve the Problem

The present invention is a side airbag device stowed in a side support part of a vehicle seat, which includes: an airbag capable of expanding and deploying toward a front side from the side support part; an inflator that supplies expansion gas to the airbag; and a bracket that retains the airbag in a compressed state. The inflator is secured to an inner side (occupant side) of a side frame of the vehicle seat. Furthermore, the bracket has a rear region that covers a rear side of the airbag in a compressed state and an inner region that extends continuously forward from the rear region between an inner side of the airbag and a seat pad.

Herein, "capable of expanding and deploying toward a front side" does not preclude partial deployment toward an inner side (occupant side) of the seat.

"Compressed state" refers to a state in which the product is stowed, and is intended to include various forms such as folded, rolled, and the like.

"Retains" means to retain the compressed airbag so as to not spread out, not necessarily to exert a force that compresses the airbag.

"Seat pad" is, for example, a cushion material containing a urethane foam material or the like to provide cushioning to a seat. In addition, "between an inner side of the airbag and a seat pad" allows a case where the two are in close contact, as well as a case where there is a slight gap.

As described above, the present invention is provided with a bracket having a rear region covering a rear side of an airbag in a compressed state and an inner region extending continuously to the front from the rear region between an inner side of the airbag and a seat pad. Therefore, when the airbag starts to deploy, the rear region of the bracket is used as a reaction surface to ensure that the airbag deploys reliably and efficiently toward the front. In addition, the presence of the inner region of the bracket also facilitates forward deployment of the airbag along the inner region. In other words, when the airbag starts to deploy, the rear portion of the airbag can be prevented from deploying rearward or diagonally rearward. As a result, the airbag deployment shape and deployment posture are favorable, and the deployment rate of the airbag is improved.

The bracket can have a structure with an opening portion on a front side of the airbag.

With the horizontal cross section of the airbag in a compressed state as viewed from above, the opening portion can be provided on an outer side of the side frame.

With the horizontal cross section of the airbag in a compressed state as viewed from above, the opening portion can be provided across an entire front edge region of the airbag.

With the horizontal cross section of the airbag in a compressed state as viewed from above, the opening portion can be provided on a portion of a front edge of the airbag.

The rear region and inner region of the bracket can be formed to follow the external shape of the airbag in a compressed state. Furthermore, the rear region and inner region of the bracket can be formed to closely fit to the external shape of the airbag in a compressed state. Thus, by having the bracket follow or closely fit to the shape of the airbag in a compressed state, the airbag can be reliably retained, and the airbag device (module) can be compactly stowed.

The bracket is preferably molded from a material of higher rigidity than a base fabric material included in the airbag.

Herein, "high rigidity" of the material from which the bracket is molded refers to a rigidity where the bracket is sufficiently strong to retain the airbag in a compressed state and yet can be deformed by airbag deployment. For example, a cover containing a flexible material such as a non-woven fabric or the like is not included in the bracket of the present invention. Furthermore, the bracket of the present invention also does not include a housing-like cover in which the entire airbag would be completely stowed.

The bracket can be molded from resin, metal, or a mixed material of resin and metal. Note that a material other than the material described above can be used so long as the novel bracket in the present invention exhibits the essential function thereof.

The rear region of the bracket can have a structure that engages with a stud bolt of the inflator. For example, by forming a hole in a rear end portion of the bracket and inserting the stud bolt of the inflator into the hole, the bracket can be secured with a simple structure without increasing the number of parts.

A front end portion of the inner region of the bracket can be configured to extend to in the vicinity of a front end of the airbag in a compressed state. Such a structure would allow the airbag to deploy more reliably toward the front along the inner region.

The front end portion of the inner region of the bracket can have a structure extending to the vicinity of a front end of the side frame. Such a configuration allows the bracket to retain the airbag over as small of an area as possible and further, guide deployment of the airbag. If the front end portion of the inner region of the bracket does not reach the front end of the side frame, deployment easily occurs toward an inner side of the seat.

The bracket can further include an outer region extending between the airbag and the side frame from the rear region. Providing the outer region of the bracket allows the airbag to deploy forward while being guided by both the inner region and outer region of the bracket, thus ensuring more reliable control (guidance) of the forward deployment of the airbag.

The outer region of the bracket can include a first portion facing forward (vehicle traveling direction) on a front edge portion of the side frame. By providing such a first portion, a portion of the airbag positioned more in front of the side frame deploys quickly and reliably toward the front using the first portion as a reaction surface.

The width of the bracket in an up-down direction is preferably larger than the length of the inflator in the up-down direction. Such a configuration ensures that the pressure of gas discharged from the inflator is supported in the rear region of the bracket. If the width of the bracket in the up-down direction is smaller than the length of the inflator in the up-down direction, a portion of the gas discharged from the inflator directly reaches an inner surface of the airbag, causing the portion to expand rearward, thereby making it difficult to control the airbag deployment posture.

In the specification and claims of the present application, the direction in which the occupant is facing (the direction of vehicle travel) when the occupant is seated in the seat in a normal posture is referred to as "forward" and the opposite direction is referred to as "rear", and the axis of the coordinates are referred to as the "front-rear direction". Moreover, when the passenger is seated in the seat in a regular posture, the right of the passenger is referred to as the "right direction," the left of the passenger is referred to as the "left direction," and the direction indicating the coordinate axis is referred to as the "left and right direction." In the left-right direction, a region on an occupant side from a side frame of the seat shall be referred to as "inside", and a region opposite from the occupant as viewed from the side frame shall be referred to as "outside". Similarly, when the passenger is seated in the seat in a regular posture, the head direction of the passenger is referred to as "up," the waist direction of the passenger is referred to as "down," and the direction indicating the coordinate axis is referred to as the "vertical direction."

The side airbag apparatus according to the present invention includes a type which is deployed on the door side of (outside) the seat, along with a type which is deployed on the vehicle center side of the seat. A side airbag device of a type which is deployed on the vehicle center side of the seat, for example, is referred to as a far side airbag, front center airbag, rear center airbag, and the like.

DESCRIPTION OF THE PREFERRED EMBODIMENTS

A side airbag device according to embodiments of the present invention will be described below with reference to the accompanying drawings.

Figure 1:
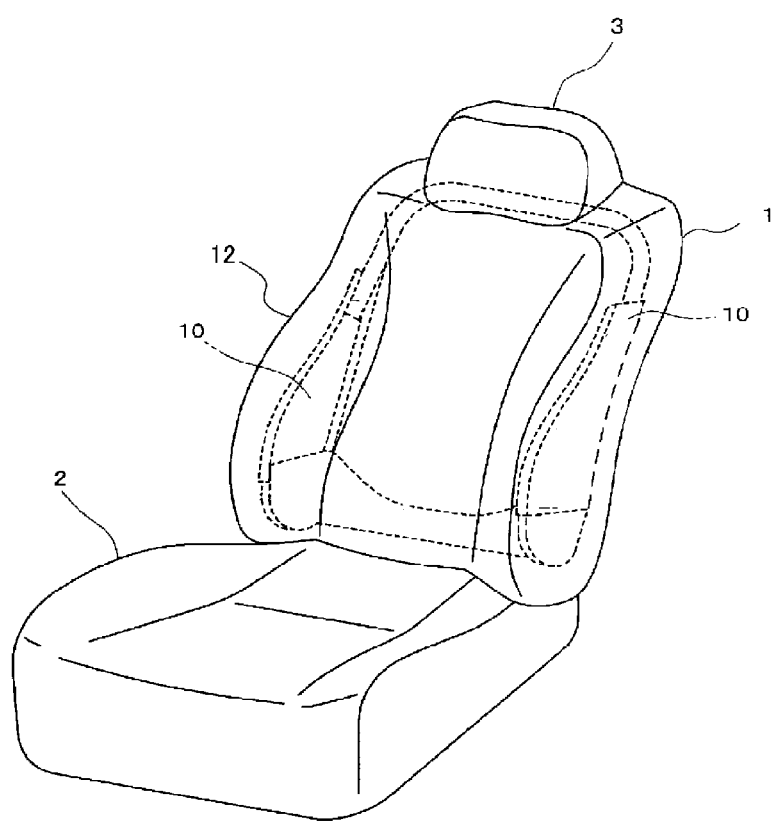
FIG. 1 is a perspective view primarily illustrating the external shape of a vehicle seat according to the present invention, with an illustration of a side airbag device omitted.
Figure 2:
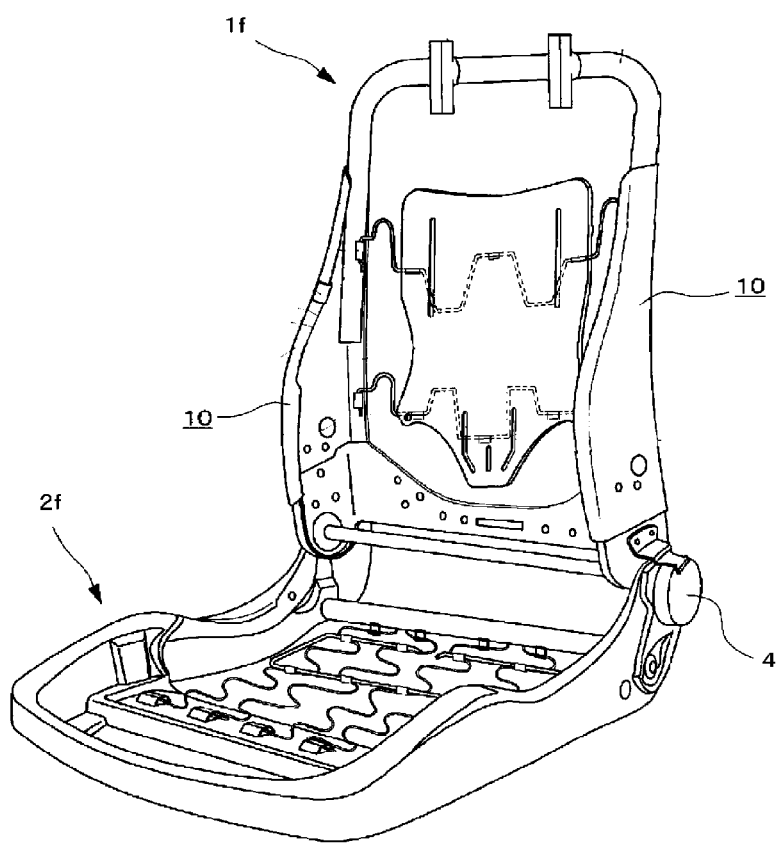
FIG. 2 is a perspective view illustrating an internal structure (seat frame) functioning as a framework of the vehicle seat illustrated in FIG. 1, with an illustration of the side airbag device omitted.
Figure 3:
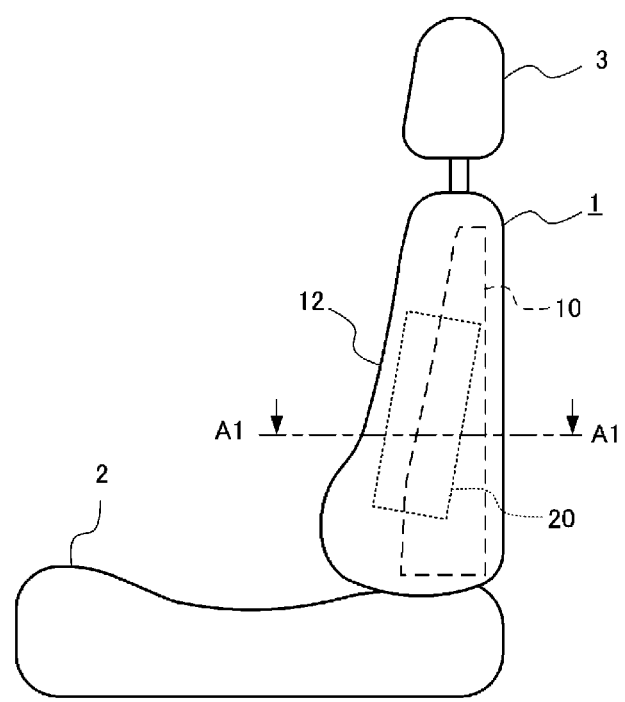
FIG. 3 is a schematic side surface view of the vehicle seat according to the present invention, schematically illustrating a condition where the side airbag device is stowed therein, observed from the outside in a vehicle width direction.
Figure 3:
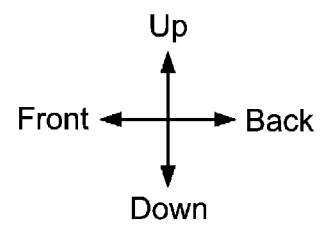

FIG. 1 is a perspective view primarily illustrating an external shape of a vehicle seat according to the present invention, with an illustration of an airbag device (airbag module) 20 omitted. FIG. 2 is a perspective view illustrating an internal structure (seat frame) functioning as a framework of the vehicle seat illustrated in FIG. 1, with an illustration of the airbag device (airbag module) 20 omitted herein as well. FIG. 3 is a schematic side surface view of the vehicle seat according to the present invention, illustrating a condition where the airbag device (airbag module) 20 is stowed on a side surface (near side) near a left side seat door as observed from the outside in the vehicle width direction.

As illustrated in FIG. 1 and FIG. 2, the vehicle seat in the present embodiment, when viewed as a part, is composed of a seat cushion 2 of a portion in which an occupant is seated; a seat back 1 forming a backrest; and a headrest 3 connected to the upper end of the seat back 1.

As illustrated in FIG. 2, a seatback frame 1*f* forming a skeleton of the seat is provided inside the seatback 1, a pad 16 (see FIG. 4) containing a urethane foam material or the like is provided on a surface and periphery thereof, and a surface of the pad 16 is covered with a surface skin 14 (see FIG. 4) such as leather, fabric, or the like. A seating frame 2*f* is provided on a bottom side of the seat cushion 2. Similar to the seat back 1, a pad including a urethane foam material or the like is provided on an upper surface and periphery thereof, and a surface of the pad is covered by the skin 14 (see FIG. 4) such as leather, fabric, or the like. The seating frame 2*f* and the seatback frame 1*f* are connected via a reclining mechanism 4.

As illustrated in FIG. 2, the seat back frame 1*f* is configured into a frame shape by side frames 10 disposed laterally spaced apart and extending in the vertical direction, an upper frame connecting the upper ends of the side frames 10, and a lower frame connecting the lower ends thereof. The headrest 3 is configured by providing a cushioned component outside a headrest frame.

Figure 4:
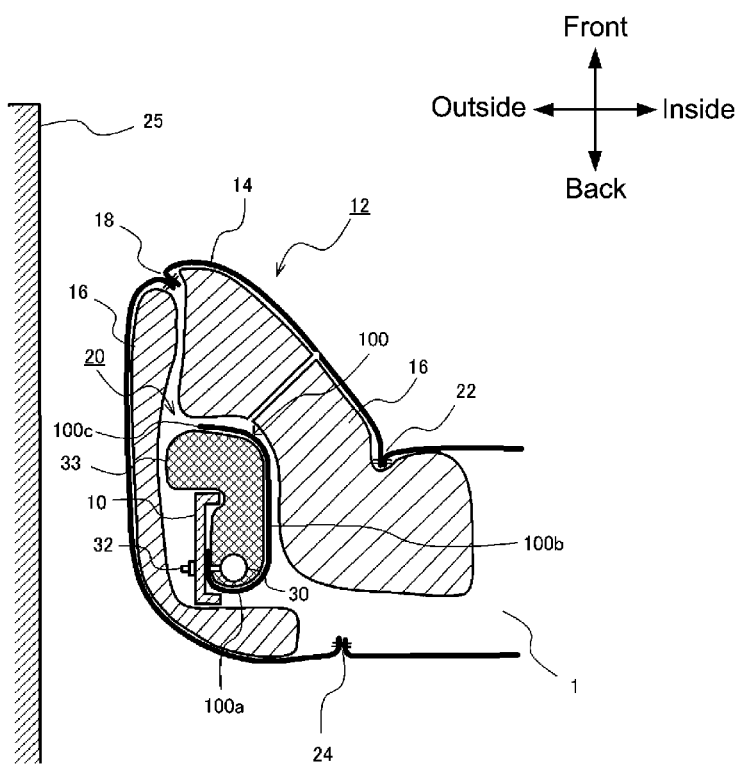
FIG. 4 is a cross sectional view illustrating the structure of the vehicle seat according to the present invention, corresponding to part of a cross section in an A1-A1 direction of FIG. 3.
Figure 5A:
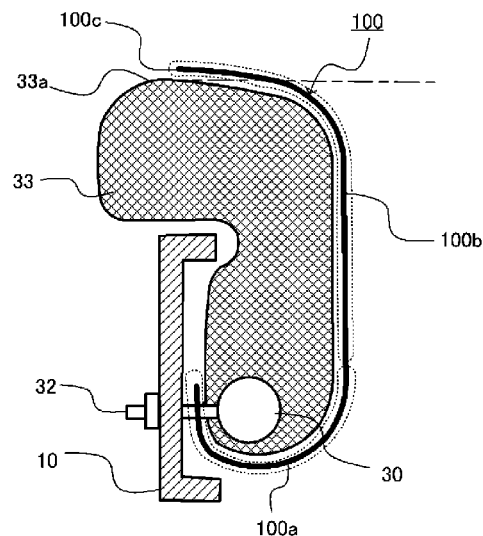
FIG. 5(A) is a cross sectional view illustrating a stowed condition of the side airbag device according to the present invention, which is an enlarged view of a part of FIG. 4. In addition, FIGS. 5(B) and (C) are cross sectional views illustrating other Embodiments of the side airbag device according to the present invention.

FIG. 4 is a cross sectional view illustrating the structure of the vehicle seat according to the present invention, corresponding to a part of a cross section in an A1-A1 direction of FIG. 3. FIG. 5(A) is a cross sectional view illustrating a stowed condition of the side airbag device according to the present invention, which is an enlarged view of a part of FIG. 4.

As illustrated in FIG. 4, the seat back 1 includes a side supporting part 12 which swells in the vehicle traveling direction (vehicle front) on a side part (end part) in the vehicle width direction. A urethane pad 16 is arranged inside the side supporting part 12, and the side airbag device 20 is stowed in a gap of the urethane pad 16. The side airbag device 20 includes: an airbag 33 that restrains an occupant when expanded and deployed; and an inflator 30 that supplies an expansion gas to the airbag 33.

The side frame 10 can be molded of resin or metal and, as illustrated in FIG. 4, can be formed into a U-shaped or L-shaped cross sectional shape. The inflator 30 is secured by a stud bolt 32 at the inner side of the side frame 10 (center side of the seat).

Seams 18, 22, 24 of the skin 14 of the seat back 1 are interwoven and connected by sewing. The seam 18 on the front side is cleft when the airbag is deployed. In FIG. 4, reference code 25 indicates a door trim.

The side airbag device 20 according to the present invention has a bracket 100 that retains the airbag 33 in a compressed state. The bracket 100 has a rear region 100a that covers a rear side of the airbag 33 in a compressed state and an inner region 100b that extends continuously forward from the rear region 100a between an inner side of the airbag 33 and a seat pad 16.

The bracket 100 is molded into a seat shape from a material with a higher rigidity than a base fabric material included in the airbag 33. Herein, "high rigidity" is degree of rigidity where the bracket 100 is sufficiently strong for retaining the airbag 33 in a compressed state yet can be deformed by deployment of the airbag 33. The bracket 100 can be molded from resin, metal, or a mixed material of resin and metal. For example, an electro-galvanized steel sheet (SECC) or cold-rolled steel sheet (SPCC) at a thickness of approximately 0.5 mm can be used as a material for the bracket 100.

The rear region 100a of the bracket 100 is a structure that engages with the stud bolt 32 of the inflator 30. Two holes are formed in the rear end portion of the bracket 100, and the stud bolts 32 of the inflator 30 can be inserted into the holes to secure the bracket 100.

The rear region 100a and inner region 100b of the bracket 100 are formed to closely fit to and follow an external shape of the airbag 33 in a compressed state. Thus, by making the bracket 100 closely fit to follow the shape of the airbag 33 in a compressed state, the airbag 33 can be reliably retained and the airbag device (module) can be compactly stowed.

As illustrated in FIG. 5(A), a front end portion 100c of the inner region 100b of the bracket 100 extends to the vicinity of a front end 33a of the airbag 33 in a compressed state. In this case, the airbag 33 can be deployed more reliably to the front along the inner region 100b. Note that in FIGS. 5(A), (B), and (C), each region (100a, 100b, 100d) of the bracket 100 is illustrated as a general area enclosed by a dashed line.

Figure 5B:
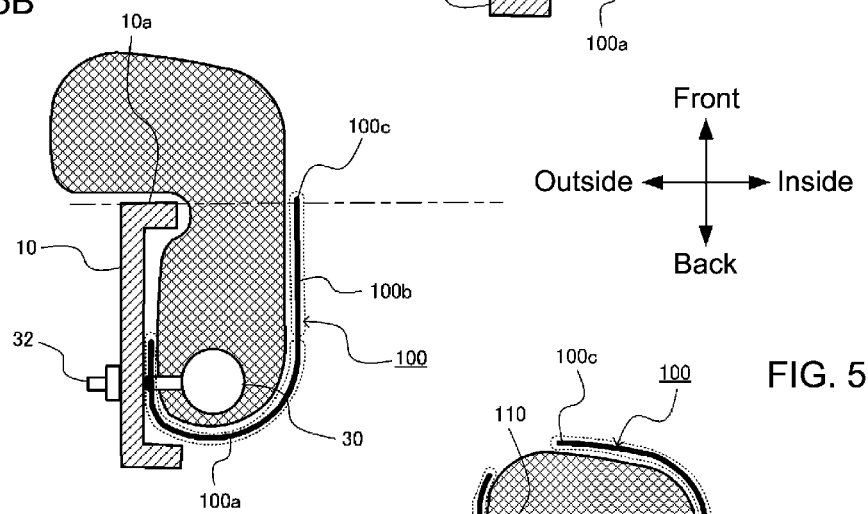

FIGS. 5(B) and (C) are cross sectional views illustrating other Embodiments of the side airbag device according to the present invention. In the Embodiment illustrated in FIG. 5(B), the front end portion 100c of the inner region 100b of the bracket 100 is a structure extending to the vicinity of a front end 10a of the side frame 10. In this case, the bracket 100 can retain the airbag 33 over as small of an area as possible and still guide deployment of the airbag 33. If the front end portion 100c of the inner region 100b of the bracket 100 does not reach the front end 10a of the side frame 10, the airbag 33 may easily over-deploy to the inner side of the seat and slow forward deployment.

Figure 5C:
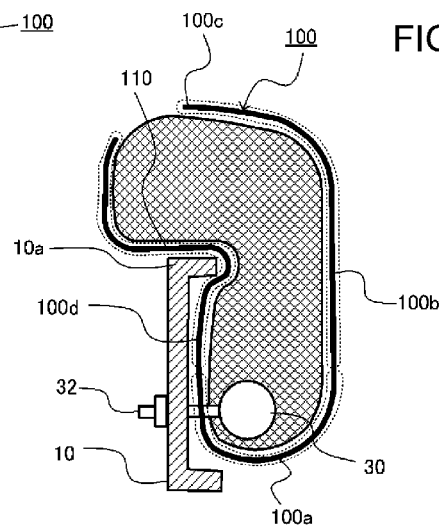

In the Embodiment illustrated in FIG. 5(C), the bracket 100 is configured to include the outer region 100d extending between the airbag 33 and side frame 10 from the rear region 100a. Providing the outer region 100d of the bracket 100 allows the airbag 33 to deploy forward while being guided between both the inner region 100b and outer region 100d of the bracket 100, thus ensuring more reliable control (guidance) of the forward deployment of the airbag 33.

The outer region 100d of the bracket 100 includes a first portion 110 facing forward (vehicle traveling direction) on the front edge portion 10a of the side frame 10. Thereby, a portion of the airbag 33 positioned more in front of the side frame 10 deploys reliably to the front using the first portion 110 as a reaction surface.

Figure 6:
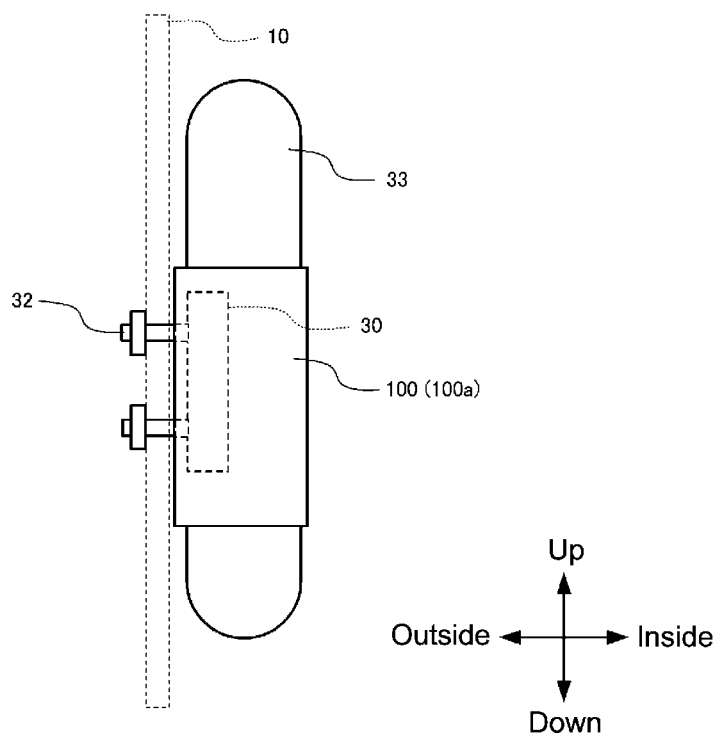
FIG. 6 is a schematic view illustrating a stowed condition of the side airbag device according to the present invention, observed from a rear side.

FIG. 6 is a schematic view illustrating a stowed condition of the side airbag device according to the present invention, observed from the rear. As illustrated in FIG. 6, the width (height) of the bracket 100 in an up-down direction is larger than the length of the inflator 30 in the up-down direction. In this case, the pressure of gas discharged from an outer circumferential portion of the inflator 30 is supported by the rear region 100a of the bracket 100. If the width of the bracket 100 in the up-down direction is smaller than the vertical length of the inflator 30 in the up-down direction, a portion of the gas discharged from the inflator 30 directly reaches an inner surface of the airbag 33, causing a portion of the airbag 33 to expand rearward, thereby making control of the deployment posture of the entire airbag 33 difficult.

As described above, the present invention is provided with the bracket 100 having the rear region 100a covering a rear side of the airbag 33 in a compressed state and the inner region 100b extending continuously from the rear region 100a to the front between the inner side of the airbag 33 and the seat pad 16. Therefore, when the airbag 33 starts to deploy, the rear region 100a of the bracket 100 is used as a reaction surface to ensure that the airbag 33 deploys reliably and efficiently toward the front.

Furthermore, the presence of the inner region 100b of the bracket 100 also facilitates forward deployment of the airbag 33 along the inner region 100b. In other words, when the airbag 100 [sic] starts to deploy, the rear portion of the airbag 33 can be prevented from deploying rearward (or diagonally rearward). As a result, the deployment shape and deployment posture of the airbag 33 are favorable, and the deployment rate of the airbag 33 is improved.

Although the present invention has been described with reference to embodiments, the present invention is not limited in any way to these embodiments, and can be changed as appropriate within the scope of the technical idea of the present invention. For example, while a side airbag on the near side has been predominantly mentioned in the embodiments described above, use is also possible with a far side airbag (surface on the far side from a vehicle door of a vehicle seat), in very small vehicles such as a single seat vehicle (irrespective of the presence of a door, a vehicle including parts with only one seat in a single row), and the like.

The invention claimed is:

1. A side airbag device stowed in a side support part of a vehicle seat, comprising:
   an airbag capable of expanding and deploying toward a front side from the side support part;
   an inflator that supplies expansion gas to the airbag; and
   a bracket that retains the airbag in a compressed state; wherein
   the inflator is secured to an inner side (occupant side) of a side frame of the vehicle seat, and
   the bracket has a rear region that covers a rear side of the airbag in the compressed state and an inner region that extends continuously forward from the rear region between an inner side of the airbag and a seat pad, the bracket further includes a front end portion that curves outward relative to the inner region of the bracket to cover a portion of the airbag with the airbag disposed directly between the inflator and the front end portion,
   wherein the bracket has an opening portion on the front side of the airbag.

2. The side airbag device according to claim 1, wherein with a horizontal cross section of the airbag in the compressed state as viewed from above, the opening portion is provided on an outer side of the side frame and a portion of the airbag in the compressed state extends through the opening.

3. The side airbag device according to claim 1, wherein with a horizontal cross section of the airbag in the compressed state as viewed from above, the opening portion is provided across an entire front edge region of the airbag.

4. The side airbag device according to claim 3, wherein a front end portion of the inner region of the bracket extends to a vicinity of a front end of the side frame.

5. The side airbag device according to claim 1, wherein with a horizontal cross section of the airbag in the compressed state as viewed from above, the opening portion is provided on a portion of a front edge of the airbag.

6. The side airbag device according to claim 1, wherein a front end portion of the inner region of the bracket extends to a vicinity of the front end portion of the airbag in the compressed state.

7. The side airbag device according to claim 1, wherein the bracket further includes an outer region extending from the rear region between the airbag and the side frame.

8. The side airbag device according to claim 7, wherein the outer region of the bracket includes a first portion facing forward (vehicle traveling direction) on a front edge portion of the side frame.

9. The side airbag device according to claim 1, wherein the rear region and the inner region of the bracket are formed in a shape that follows an external shape of the airbag in the compressed state.

10. The side airbag device according to claim 1, wherein the rear region and the inner region of the bracket are formed so as to closely fit to an external shape of the airbag in the compressed state.

11. The side airbag device according to claim 1, wherein the bracket is molded from a material of higher rigidity than a base fabric material of the airbag.

12. The side airbag device according to claim 11, wherein the bracket has sufficient strength for retaining the airbag in the compressed state, and can deform due to deployment of the airbag.

13. The side airbag device according to claim 1, wherein the rear region of the bracket is engaged with a stud bolt of the inflator.

14. The side airbag device according to claim 1, wherein a width of the bracket in an up-down direction is larger than a length of the inflator in the up-down direction.

* * * * *